United States Patent [19]

Iwase et al.

[11] Patent Number: 5,085,102
[45] Date of Patent: Feb. 4, 1992

[54] HYDRAULIC CONTROL APPARATUS FOR AUTOMATIC TRANSMISSIONS

[75] Inventors: Yoshinobu Iwase; Shiro Sonoda; Kazuaki Watanabe; Isamu Minemoto; Teruo Akashi, all of Aichi, Japan

[73] Assignee: Aisin Seiki Kabushiki Kaisha, Kariya, Japan

[21] Appl. No.: 501,770

[22] Filed: Mar. 30, 1990

[30] Foreign Application Priority Data

Mar. 30, 1989 [JP] Japan .................. 1-35518[U]

[51] Int. Cl.$^5$ ............................ F15C 3/02
[52] U.S. Cl. ................... 74/867; 137/625.69; 192/4 A
[58] Field of Search ............. 74/866, 867, 869; 137/625.69

[56] References Cited

U.S. PATENT DOCUMENTS

| | | | |
|---|---|---|---|
| 3,707,891 | 1/1973 | Asano et al. | 74/869 |
| 3,990,549 | 11/1976 | Sisson et al. | 137/625.69 X |
| 4,726,262 | 2/1988 | Hayakawa et al. | 74/866 |
| 4,827,807 | 5/1989 | Hayakawa et al. | 74/869 |

FOREIGN PATENT DOCUMENTS

| | | |
|---|---|---|
| 58-30566 | 2/1983 | Japan . |
| 62-75157 | 4/1987 | Japan ............ 74/867 |
| 1-195163 | 8/1989 | Japan . |

*Primary Examiner*—Allan D. Herrmann
*Assistant Examiner*—William O. Trousdell
*Attorney, Agent, or Firm*—Burns, Doane, Swecker & Mathis

[57] ABSTRACT

A hydraulic control apparatus for an automatic transmission having a mechanical parking mechanism includes a manual valve disposed in the hydraulic control apparatus and having a parking (P) position, reverse (R) position, neutral (N) position and at least one forward speed position. The manual valve is provided with a drain port for releasing, in the parking position, the hydraulic pressure of a hydraulic circuit which establishes the reverse range, and the drain port is provided with an orifice which limits the discharge rate of hydraulic pressure.

4 Claims, 4 Drawing Sheets

(N)

HYDRAULIC CONTROL APPARATUS FOR AUTOMATIC TRANSMISSIONS

FIELD OF THE INVENTION

This invention relates to a hydraulic control apparatus for a vehicular automatic transmission having a mechanical parking mechanism.

BACKGROUND OF THE INVENTION

The abovementioned parking mechanism is adapted to engage a gear member secured to the output shaft of the transmission with a pawl member pivotally supported on the transmission case to fix the output shaft to the transmission case when the vehicle is parked.

When a manual valve within the hydraulic control apparatus of an automatic transmission is shifted from reverse (R) to parking (P), the oil line communicating with the manual valve is changed over and a drain oil line is opened to discharge the pressurized oil that establishes the R range (see the specification of Japanese Patent Kokai No. 58-30566). In the conventional drain oil line, this discharge of pressurized oil is performed in rapid fashion.

DISCUSSION OF PROBLEMS IN THE ART

Engine ouput is transferred to the transmission output shaft via friction engaging means, and from the output shaft to the drive system (propeller shaft, differential gear unit, axle shaft). Torsion is produced in the transmission ouput shaft and the drive system owing to transmission of this output (torque).

This torsion naturally is produced in the R range. However, when hydraulic pressure in the friction engaging means taking part in establishing the R range is rapidly released at the time of the R to P shifting, the torsion produced in the output shaft and drive system suddenly is removed. As a result, when the R to P shifting is made, the sound of gears clashing is produced between the gear member secured to the output shaft and the pawl member engaging with it, thereby causing the passengers to experience an unpleasant sensation.

SUMMARY OF THE DISCLOSURE

Accordingly, an object of the present invention is to provide a novel hydraulic control apparatus of an automatic transmission which solves the foregoing problem.

According to the present invention, the foregoing object is attained by providing a hydraulic control apparatus for an automatic transmission having a mechanical parking mechanism, characterized in that a manual valve disposed in hydraulic control apparatus and having a parking (P) position, reverse (R) position, neutral (N) position and at least one forward speed position is provided with a drain port for a reverse range for releasing, in the parking position, hydraulic pressure of a hydraulic circuit which establishes the reverse range, and the drain port is provided with an orifice which limits the release of hydraulic pressure.

In order to mitigate the release of torsional torque produced in the drive system which includes the transmission output shaft, one expedient might be to provide a shock absorbing device (damper) at a suitable location in the drive system. For example, the shock absorbing device may be provided between the gear member and the output shaft to absorb a sudden change in the torque of the output shaft. However, such an expedient is disadvantageous in that the device is complicated, enlarges the size of the apparatus, requires a major modification and raises cost.

The present invention attains the foregoing object through a simple construction and by making a slight modification in the conventional apparatus. Specifically, an orifice is provided in the drain circuit for drainage when the manual valve is shifted from the reverse position to the parking position. The orifice can be attained very simply and inexpensively merely by changing the drain hole diameter of a separate plate, by way of example.

When a shifting is made to the reverse range, pressurized oil is fed to the friction engaging means taking part in establishing the reverse range, and the output of the engine is transmitted from the transmission output shaft to the wheels of the vehicle via the abovementioned drive system, thereby placing the vehicle in the reverse range. Torsion is produced in the transmission output shaft and drive system by transmission of this output (torque).

When the manual valve is shifted from the reverse position (R) to the parking position (P), this is accompanied by a changeover in the oil line communicating with the manual valve, and the friction devices which were participating in establishing the R range are connected to a drain line. The drain line is provided with the orifice, and the pressurized oil in the friction engaging means is discharged via the orifice.

The orifice restricts the discharging rate of pressurized oil, whereby the release of hydraulic pressure in the friction device is performed slowly and gradually. As a result, violent spring-back release of the torsional torque produced by the ouput shaft and drive system is suppressed, and the clashing sound of gears produced in the parking mechanism by such violent spring-back release is greatly mitigated.

Thus, as described above, the present invention makes it possible to greatly reduce, through a simple arrangement, the unpleasant sound of clashing gears produced when the vehicle is shifted from reverse to parking.

Since the effects of the invention can be achieved merely by providing the drain circuit with the orifice, advantages are obtained in terms of cost because the conventional apparatus does not require a major modification. In addition, the apparatus of the present invention is not rendered complicated or large in size.

Other features and advantages of the present invention will be apparent from the following description taken in conjunction with the accompanying drawings, in which like reference characters designate the same or similar parts through out the figures thereof.

BRIEF DESCRIPTION OF THE DRAWINGS

FIGS. 1 through 3 illustrate an automatic transmission having a hydraulic control apparatus embodying the present invention, in which FIGS. 1, 2 and 3 are diagrams showing the transmission when in the reverse range, parking range and neutral range, respectively.

DESCRIPTION OF THE PREFERRED EMBODIMENT

An embodiment of the present invention will now be described in detail with reference to the drawings.

Figure 1:
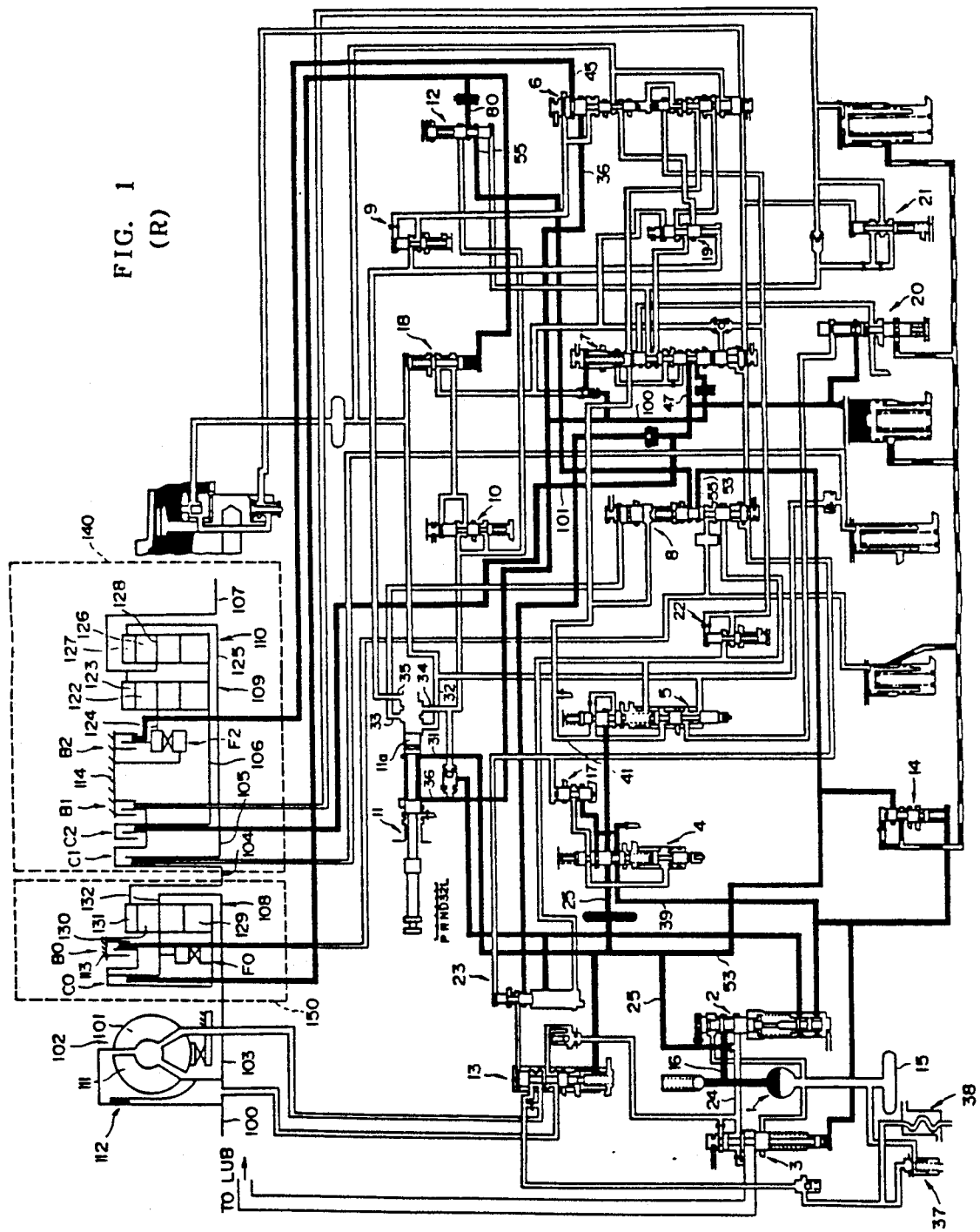
Figure 2:
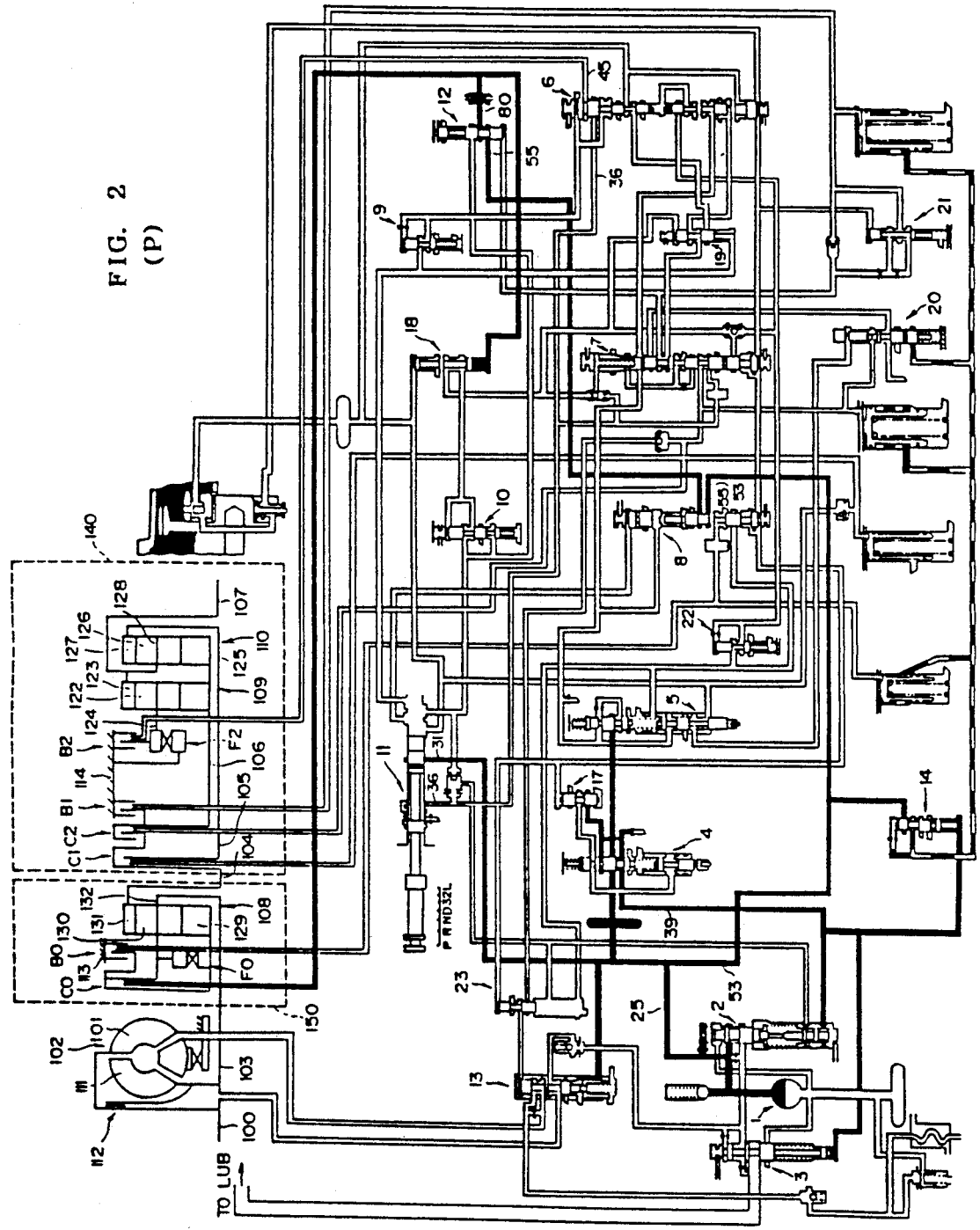
Figure 3:
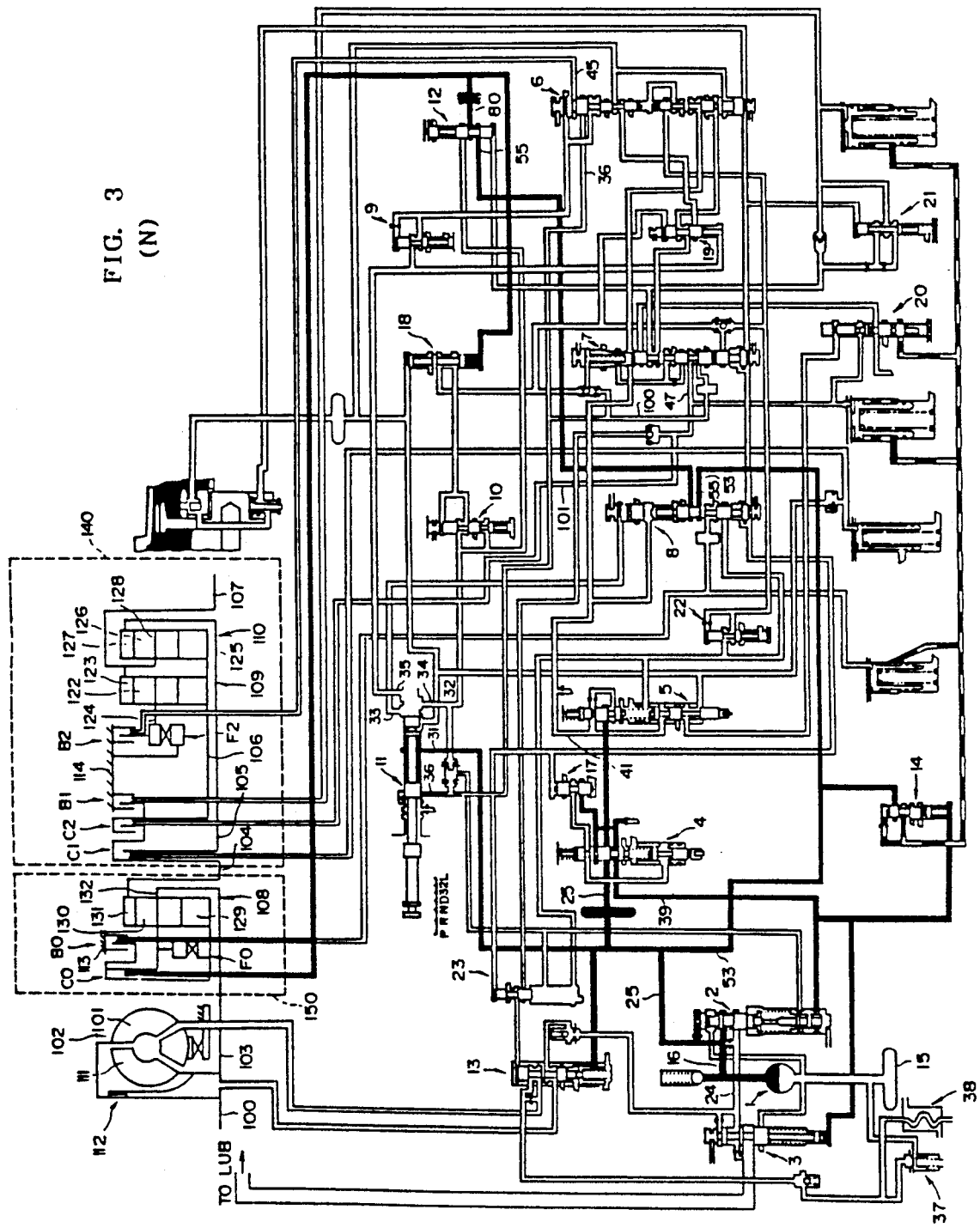

FIGS. 1 through 3 illustrate an example of an automatic transmission having four forward speeds and one reverse speed provided with a direct coupling (high-gear) clutch. The upper part of each Figure is a schematic view of a planetary gear transmission mechanism, and the lower part of each Figure is a hydraulic control circuit of the hydraulic control apparatus.

The automatic transmission comprises a torque converter 102, an overdrive mechanism 150 for fourth speed, and a planetary gear transmission mechanism 140 establishing three forward speeds and a reverse speed. The automatic transmission is controlled by the hydraulic control apparatus shown in the lower part of each Figure. The torque converter 102 is well known one and includes a pump 101 connected to an engine output shaft 100, and a turbine 111 connected to an input shaft 103.

The torque converter 102 is provided with a direct coupling clutch 112 which couples the engine output shaft 100 and the input shaft 103 mechanically without the intermediary of a fluid.

The input shaft 103 is connected to a carrier 132 of a hydraulically controlled planetary gear set in the overdrive mechanism. A planetary pinion 130 rotatably supported by the carrier 132 is in mesh with a sun gear 129 and a ring gear 131. A multiple-disk clutch C0 and a one-way clutch F0 are provided between the sun gear 129 and carrier 132. A multiple-disk brake B0 is provided between the sun gear 129 and an overdrive case 113 housing the overdrive mechanism. The ring gear 131 is connected to the input shaft 104 of the planetary gear transmission mechanism 140 comprising two planetary gear sets 110 and 109. A multiple-disk clutch C2 is provided between an input shaft 104 and a sun gear shaft 106, and a multiple-disk brake B1 is provided between the sun gear shaft 106 and a transmission case 114. A sun gear 125 is provided on the sun gear shaft 106. The sun gear 125, along with a carrier 128, a planetary pinion 126 carried by this carrier, a ring gear 127 in mesh with this pinion, another carrier 124, a planetary pinion 122 carried by this carrier, and a ring gear 123 in mesh with the pinion, constructs said two planetary gear sets 110, 109. The ring gear 127 in the planetary gear sets 110 is coupled to an intermediate shaft 105 coaxially disposed through the sun gear shaft 106. The carrier 128 is coupled to the ring gear 123 in the other, planetary gear set 109. These carriers and ring gears are coupled to the output shaft 107. A multiple-disk brake B2 and a one-way clutch F2 are provided between the transmission case 114 and the carrier 124 in the planetary gear set 109.

This automatic transmission equipped with the overdrive mechanism is such that each of the clutches and brakes is engaged or disengaged by the hydraulic control apparatus, described below, in dependence upon engine output and vehicle velocity, and the transmission is so adapted as to shift the four forward speeds, inclusive of overdrive (O/D), and the one reverse speed.

Table 1 shown below illustrates shift gear positions and the operating states of the clutches and brakes.

TABLE 1

| Shift Position | | Gear | L/U | C0 | C1 | C2 | B0 | B1 | B2 | F0 | F2 |
|---|---|---|---|---|---|---|---|---|---|---|---|
| P | | Parking | | o | | | | | | o | |
| R | | Reverse | | o | | o | | | o | o | |
| N | | Neutral | | o | | | | | | o | |
| D | 4th | Overdrive | o | | o | o | o | | | | |
| | 3rd | Third | o | o | o | o | | | | c | |
| | 2nd | Second | | | o | | | o | | ⊙ | |
| | 1st | First | | o | o | | | | | o | ⊙ |
| 3 | 3rd | Third | o | o | o | o | | | | o | |
| | 2nd | Second | | | o | | | o | | ⊙ | |
| | 1st | First | | o | c | | | | | o | ⊙ |
| 2 | 2nd | Second | | o | o | | | o | | o | |
| | 1st | First | | o | o | | | | | o | ⊙ |
| 1 | 1st | First | | o | o | | | | o | o | o |

In the above table, "○" indicates that the clutch or brake is in the engaged state. The absence of the "○" mark means that the clutch or brake is the disengaged (released) state. The "⊙" marks indicates that the clutch is actuated only when it is in a driving state.

The hydraulic control apparatus for controlling the foregoing transmission mechanism will now be described.

The hydraulic control apparatus comprises an oil pump 1, a primary regulator valve 2, a secondary regulator valve 3, a primary throttle valve 4, a secondary throttle valve and kick-down valve 5, a cut-back valve 17, a low-coast modulator valve 9, a second-coast modulator valve 10, a 1-2 shift valve 6, a 2-3 valve 7, a 3-4 shift valve 8, a D-2 timing valve 18, a second hold valve 19, a 2-3 shift timing valve 20, a 3-2 kick-down orifice control valve 21, a manual valve 11, an overdrive clutch exhaust valve 12, a lock-up relay valve 13, a lock-up signal valve 23, a detent regulator valve 22, an accumulator control valve 14, and accumulators for smoothly engaging the clutches and brakes (friction engaging means).

The oil pump 1 discharges oil, which has been pumped up from an oil reservoir (not shown) via an oil strainer 15, into an oil line 16. This oil is regulated to a predetermined hydraulic pressure (line pressure) by the primary regulator valve 2. Excess oil in the regulator valve 2 is supplied to the secondary regulator valve 3 through an oil line 24 and the pressure thereof is regulated to a predetermined torque converter pressure, lubricating oil pressure and cooler pressure in dependence upon the throttle pressure of the primary throttle valve 4.

A cooler bypass valve 37 limits the supply pressure to the oil cooler 38 to a low valve, and an oil cooler 38 cools the oil heated by the torque converter.

The manual valve 11 communicates with the output side of the primary regulator valve 2 by the oil lines 25 and 31 and is coupled to the shift lever. The manual valve 11 is manually moved to the parking (P) position, R (reverse) positon, N (neutral) position, D (drive) position, 3 (third) position, 2 (second) position and low (L) position in dependence upon the range of the shift lever.

In the P position, the oil line 31 is closed by a land 11a, and line pressure is supplied from the manual valve 11.

In the R position, the oil line 31 is communicated with an oil line 36 so that line pressure is supplied to the oil line 36.

In the N position, the oil line 31 is not communicated with any oil line of the manual valve, so that line pressure is supplied from the manual valve.

In the D position, the oil line 31 is communicated with an oil line 32 and line pressure is supplied to the oil line 32.

In the 3 position, the oil line 31 is communicated with the oil line 32 and an oil line 33 so that line pressure is supplied to each of these oil lines.

In the 2 position, the oil line 31 is communicated with the oil lines 32, 33 and an oil line 34 so that line pressure is supplied to these oil lines.

In the L position, the oil line 31 is communicated with the oil lines 32, 33, 34 and an oil line 35 so that line pressure is supplied to these oil lines.

The primary throttle valve 4 acts to provide the first throttle pressure corresponding to the amount of accelerator pedal depression, namely the magnitude of the engine output. More specifically, the line pressure from the oil line 25 is regulated in conformity with engine output and the first throttle pressure is outputted to an oil line 39.

The secondary throttle valve 5 produces the second throttle pressure in an oil line 41 by an increase or decrease in accelerator pedal depression, and the pressure acts upon the 1-2 shift valve 6, the 2-3 shift valve 7 and the 3-4 shift valve 8. This pressure serves as a force opposing governor pressure in each of shift valves 6, 7 and 8.

The 1-2 shift valve 6 performs a changeover between first gear and second gear owing to balance between governor pressure and the second throttle pressure.

The 2-3 shift valve 7 performs a changeover between second gear and third gear owing to balance between governor pressure and the second throttle pressure. When the valve spool of the 2-3 shift valve 7 is on the lower side (when second gear is in effect), an oil line 100 and an oil line 47 are in communication.

The 3-4 shift valve 8 performs a changeover between third gear and O/D (overdrive) gear owing to balance between governor pressure and the second throttle pressure. When the valve spool of this valve is on the lower side (when third gear is in effect), an oil line 53 and an oil line 55 are in communication.

The lock-up signal valve 23 defines the lock-up actuation vehicle velocity, and the lock-up relay valve 13 changes over the oil flow to the torque converter and performs lock-up control when the vehicle is travelling in third gear and in O/D gear.

The cut-back valve 17 causes cut-back pressure to act upon the throttle valve 4 at the time of low velocity, whereby the first throttle pressure is reduced to prevent unnecessary power loss by the oil pump.

The low-coast modulator valve 9 delivers line pressure at a low-coast modulator pressure of low value in order to mitigate shift shock when a shifting is made to the L range.

The second-coast modulator valve 10 regulates the second-coast modulator pressure, which is for deciding the 3 to 2 shift point when a shift is made to the 2 range kand L range, from line pressure to low pressure.

In a case where a shift is made from the second gear to the third gear, the 2-3 shift timing valve 20 acts to mitigate shock by suddenly reducing the hydraulic pressure of the second brake (B1) when he direct coupling clutch (C2) begins to operate and obtaining and appropriate timing for the shift from the second to the third.

The detent regulator valve 22 regulates the detent regulator pressure, which acts upon the 1-2 shift valve 6 and 2-3 shift valve 7, from the the second throttle pressure to a constant pressure at the time of kick-down.

When a shifting is made to the 2 range while the vehicle is traveling in O/D, the D-2 timing valve 18 performs a downshift in the order OD to third gear to second gear, thereby smoothing engine braking.

The overdrive clutch exhaust valve 12 quickly causes the engine, upon shifting from third to second gear, to attain a rotational speed which corresponds to the second gear, thereby mitigating shock.

When kick-down is performed from the third gear to the second gear, the 3-2 kick-down orifice control valve 21 causes the actuation of the second brake (B1) made to conform to the hydraulic pressure drop of the direct coupling clutch (C2) to be delayed in dependence upon the vehicle velocity.

The accumulators act to mitigate shift shock. There are four accumulators, namely for the forward clutch (C1), direct coupling clutch (C2), second brake (B1) and overdrive brake (B0). The accumulators are installed in the transmission case. Further, accumulator control pressure from the accumulator control valve 14 acts upon the back faces of the C2, B0, B1 accumulators to obtain an appropriate hydraulic pressure characteristic from small to large throttle openings, thereby mitigating shift shock.

The accumulator control valve 14 reduces the back pressure of each accumulator at the small throttle opening and obtains line pressure from the accumulator control pressure that mitigates shift shock.

In the automatic transmission constructed as described above, FIG. 1 illustrates the hydraulic state in the reverse (R) range. FIG. 2 shows the state that prevails in the parking (P) range, and FIG. 3 the state that prevails in the neutral range (N).

When the manual valve 11 is in the R position, line pressure from the oil line 31 is fed to the first-and-reverse brake (B2) via oil lines 36, 45, this line pressure is fed to the direct coupling clutch (C2) via oil lines 36, 100, 47, 101, and the line pressure is fed to the overdrive cluch (C0) via oil lines 25, 53, 55, 80, as a result of which the R range is attained.

When the manual valve 11 is in the P position, line pressure from the oil line 25 is fed to the clutch C0 via the oil lines 53, 55, 80, whereby the P range is attained.

When the manual valve 11 is in the N position, line pressure from the oil line 25 is fed to the clutch C0 via the oil lines 53, 55, 80, whereby the N range is attained.

FIG. 4 shows enlarged views of the manual valve 11, which is provided with the orifice characterizing the present invention.

Figure 4A:
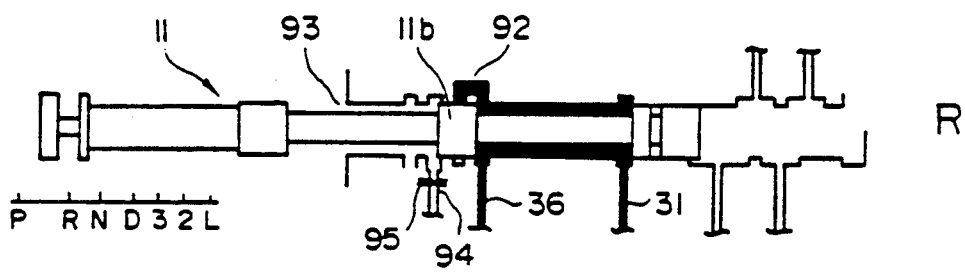
FIG. 4 shows enlarged views of a manual valve, in which FIGS. 4(A), (B) and (C) show the manual valve when in the reverse range, parking range and neutral range, respectively.

FIGS. 4(A), (B) and (C) show the spool position of the manual valve at the time of a reverse (R) shift, parking (P) shift and neutral (N) shift, respectively, A drain oil line 94 of the manual valve 11 is provided with an orifice 95. The latter limits the flowing rate of pressurized oil discharged through this oil line 94. As a result, release of the hydraulic pressure of the friction engaging means communicating with the drain line 94 is performed slowly.

When the R range prevails as on FIG. 4(A), communication between the line 36 and the drain oil line 94 and drain port is cut off by a land 11b.

Figure 4B:
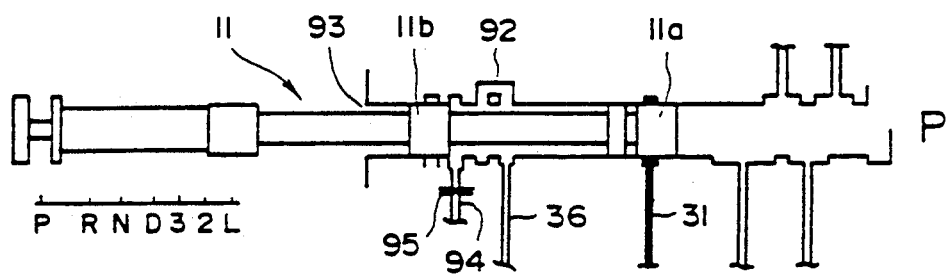

When the P range prevails as on FIG. 4(B), the land 11b allows communication between line 36 and line 94 and cuts off communication between line 36 and the drain port 93.

Figure 4C:
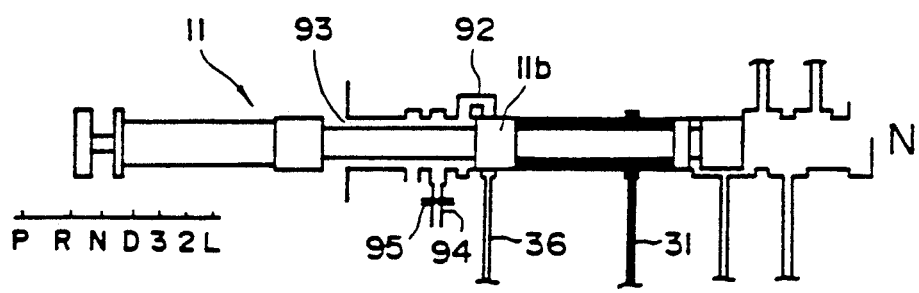

When the N range prevails as on FIG. 4(C), the land 11b prevents communication between line 36 and lines 94 and drain part 93 via port 92.

In the operation of the embodiment, a changeover from reverse (R) to parking (P) is accommpanied by a shifting from R to P in the manual valve 11. Upon the shifting the oil line 36 is communicated with the drain line 94, so that release of the hydraulic pressure of the friction engaging means communicating with the oil line 36 is performed via the orifice 95 of the drain oil line 94. More specifically, the pressurized oil that was supplied from oil line 36 to the first-and-reverse brake (B2) and direct coupling clutch (C2) in the R range flows in the opposite direction to that in the P range and is discharged via the oil line 36, orifice 95 and oil line 94.

In operative association with the R to P operation of the shift lever, a parking operation rod (not shown) is moved in the direction of the output shaft 107, as a result of which the parking pawl turns in the radially inward direction so that it pawl end engages the gear of the parkingg gear. This causes the output shaft to be fixed to the casing. The manual valve moves from the R to the P position in response to the R to P operation.

The orifice 95 limits the flowing rate of pressurized oil discharged, as a result of which the release of the hydraulic pressure acting upon the pistons of the friction engaging means B2 and C28 which participated in the generation of the torsional torque of the transmission output shaft and drive system in the R range, is performed slowly to suppress a violent spring-back release of the torsional torque, thereby mitigating the sound of clashing gears produced in the parking mechanism by such a violent spring-back release.

When there is changeover from reverse (R) to neutral (N), the oil line 36 is communicated with the drain oil line 94 and drain port 93 in the manual valve 11. Release of the hydraulic pressure of the friction engaging means B2 and C2 takes place mainly from the drain port 93 owing to the pressure of the orifice 95. Consequently, release of hydraulic pressure takes place rapidly and abnormal backward motion of the vehicle due to a delay in the hydraulic pressure release does not occur.

As many apparently widely different embodiments of the present invention can be made without departing from the spirit and scope thereof, it is to be understood that the invention is not limited to the specific embodiments thereof except as defined in the appended claims.

What is claimed is:

1. A hydraulic control apparatus for an automatic transmission having a mechanical parking mechanism, comprising:

a manual valve disposed in the hydraulic control apparatus and having a parking position, reverse position, neutral position and at least one forward speed position; and a hydraulic circuit which establishes a reverse range associated with the reverse position of the manual valve;

said manual valve being provided with a drain port for the reverse range for releasing, in the parking position, hydraulic pressure of said hydraulic circuit which establishes the reverse range;

said drain port for the reverse range being provided with an orifice which limits release of hydraulic pressure, whereby the communication between said drain port for the reverse range and a port for establishing the reverse range is established upon selecting a position for said manual valve.

2. The apparatus according to claim 1, wherein said orifice comprises a separate plate having a drain hole which defines the diameter of the orifice.

3. The apparatus according to claim 1, wherein said manual valve has spool land means which in the reverse position cuts off communication between said drain port for the reverse range and said hydraulic circuit and communicates a line pressure supply oil line connected to said manual valve with said hydraulic circuit; and which in the parking position, cut off communication between said line pressure oil line and said hydraulic circuit and communicates said hydraulic circuit with said drain port for the reverse range.

4. The apparatus according to claim 3, wherein said manual valve has a neutral drain port, and said spool land means cuts off communication between said line pressure supply oil line and said hydraulic circuit and communicates said hydraulic circuit with said drain port for the reverse range and said netral drain port.

* * * * *